(12) United States Patent
Mow et al.

(10) Patent No.: US 11,588,223 B2
(45) Date of Patent: Feb. 21, 2023

(54) ELECTRONIC DEVICE WITH MILLIMETER WAVE ANTENNAS ON PRINTED CIRCUITS

(71) Applicant: Apple Inc., Cupertino, CA (US)

(72) Inventors: Matthew A. Mow, Los Altos, CA (US); Basim H. Noori, Scotts Valley, CA (US); Ming-Ju Tsai, Sunnyvale, CA (US); Xu Han, Santa Clara, CA (US); Victor C. Lee, Sunnyvale, CA (US); Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 714 days.

(21) Appl. No.: 16/572,370

(22) Filed: Sep. 16, 2019

(65) Prior Publication Data

US 2020/0014095 A1    Jan. 9, 2020

Related U.S. Application Data

(63) Continuation of application No. 15/217,805, filed on Jul. 22, 2016, now Pat. No. 10,418,687.

(51) Int. Cl.
| | | |
|---|---|---|
| H01Q 1/24 | (2006.01) | |
| H01Q 19/30 | (2006.01) | |
| H01Q 21/06 | (2006.01) | |
| H01Q 21/28 | (2006.01) | |
| H01Q 1/22 | (2006.01) | |
| H01Q 3/24 | (2006.01) | |
| H01Q 9/06 | (2006.01) | |

(Continued)

(52) U.S. Cl.
CPC ........... *H01Q 1/243* (2013.01); *H01Q 1/2291* (2013.01); *H01Q 3/24* (2013.01); *H01Q 9/065* (2013.01); *H01Q 19/30* (2013.01); *H01Q 21/065* (2013.01); *H01Q 21/28* (2013.01); *H04B 10/90* (2013.01); *H01Q 1/526* (2013.01)

(58) Field of Classification Search
CPC ...... H01Q 1/243; H01Q 1/2291; H01Q 1/526; H01Q 3/24; H01Q 9/065; H01Q 19/30; H01Q 21/065; H01Q 21/28
See application file for complete search history.

(56) References Cited

U.S. PATENT DOCUMENTS

| | | |
|---|---|---|
| 8,013,258 B2 | 9/2011 | Wu |
| 8,024,014 B2 | 9/2011 | Boyle |

(Continued)

*Primary Examiner* — Awat M Salih
(74) *Attorney, Agent, or Firm* — Treyz Law Group, P.C.; Tianyi He

(57) ABSTRACT

An electronic device may be provided with wireless circuitry. The wireless circuitry may include one or more antennas and transceiver circuitry such as millimeter wave transceiver circuitry. The antennas may be formed from metal traces on printed circuits. A flexible printed circuit may have an area on which the transceiver circuitry is mounted. Protruding portions may extend from the area on which the transceiver circuitry is mounted and may be separated from the area on which the transceiver circuitry is mounted by bends. Antenna resonating elements such as patch antenna resonating elements and dipole resonating elements may be formed on the protruding portions and may be used to transmit and receive millimeter wave antenna signals through dielectric-filled openings in a metal electronic device housing or a dielectric layer such as a display cover layer formed from glass or other dielectric.

20 Claims, 7 Drawing Sheets

(51) Int. Cl.
   *H04B 10/90* (2013.01)
   *H01Q 1/52* (2006.01)

(56) References Cited

U.S. PATENT DOCUMENTS

| | | | |
|---|---|---|---|
| 8,629,540 | B2 | 1/2014 | Gaucher et al. |
| 8,917,218 | B2 * | 12/2014 | Kato ........................ H01Q 7/00 |
| | | | 343/788 |
| 9,000,984 | B2 | 4/2015 | Rao et al. |
| 9,225,058 | B2 * | 12/2015 | DeVries ................. H01Q 21/24 |
| 9,356,661 | B2 | 5/2016 | Samardzija et al. |
| 9,705,180 | B2 | 7/2017 | Darnell et al. |
| 10,158,384 | B1 | 12/2018 | Yarga et al. |
| 2004/0140934 | A1 | 7/2004 | Korva |
| 2006/0273817 | A1 | 12/2006 | Hsieh et al. |
| 2006/0276157 | A1 | 12/2006 | Chen et al. |
| 2007/0182642 | A1 | 8/2007 | Yanagi et al. |
| 2008/0081657 | A1 | 4/2008 | Suzuki et al. |
| 2009/0023398 | A1 | 1/2009 | Boyle |
| 2012/0235881 | A1 | 9/2012 | Pan et al. |
| 2014/0226291 | A1 | 8/2014 | Gibbs et al. |
| 2014/0320365 | A1 | 10/2014 | Hong et al. |
| 2014/0361946 | A1 | 12/2014 | Ganchrow et al. |
| 2015/0035714 | A1 | 2/2015 | Zhou |
| 2015/0325922 | A1 * | 11/2015 | Fujita ........................ H01Q 3/16 |
| | | | 343/753 |
| 2016/0261023 | A1 * | 9/2016 | Di Nallo ................. H01Q 9/42 |
| 2018/0069588 | A1 | 3/2018 | Jiang et al. |
| 2022/0190485 | A1 * | 6/2022 | Yang ........................ H01Q 1/24 |

* cited by examiner

ELECTRONIC DEVICE WITH MILLIMETER WAVE ANTENNAS ON PRINTED CIRCUITS

This application claims priority to patent application Ser. No. 15/217,805, filed Jul. 22, 2016, which is hereby incorporated by reference herein in its entirety.

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It may be desirable to support wireless communications in millimeter wave communications bands. Millimeter wave communications, which are sometimes referred to as extremely high frequency (EHF) communications, involve communications at frequencies of about 10-400 GHz. Operation at these frequencies may support high bandwidths, but may raise significant challenges. For example, millimeter wave communications are often line-of-sight communications and can be characterized by substantial attenuation during signal propagation.

It would therefore be desirable to be able to provide electronic devices with improved wireless communications circuitry such as communications circuitry that supports millimeter wave communications.

SUMMARY

An electronic device may be provided with wireless circuitry. The wireless circuitry may include one or more antennas and transceiver circuitry such as millimeter wave transceiver circuitry. The antennas may be organized in beam steering arrays.

The antennas may be formed from metal traces on printed circuits. A printed circuit substrate with metal traces that form antenna resonating elements may be soldered to a flexible or rigid printed circuit. A millimeter wave transceiver integrated circuit that is covered with a mold cap and shielding layer may be mounted on the printed circuit and may transmit and receive millimeter wave antenna signals using the antenna resonating elements on the printed circuit substrate.

A flexible printed circuit may have an area on which millimeter wave transceiver circuitry is mounted. Protruding portions of the flexible printed circuit may extend from the portion of the flexible printed circuit on which the transceiver circuitry is mounted and may be separated from the portion on which the transceiver circuitry is mounted by bends. Antenna resonating elements such as patch antenna resonating elements and dipole resonating elements may be formed on the protruding portions. The antenna resonating elements and may be used to transmit and receive millimeter wave antenna signals through a dielectric-filled opening in a metal electronic device housing or through a dielectric layer such as a display cover layer formed from glass or other dielectric.

DETAILED DESCRIPTION

Figure 1:
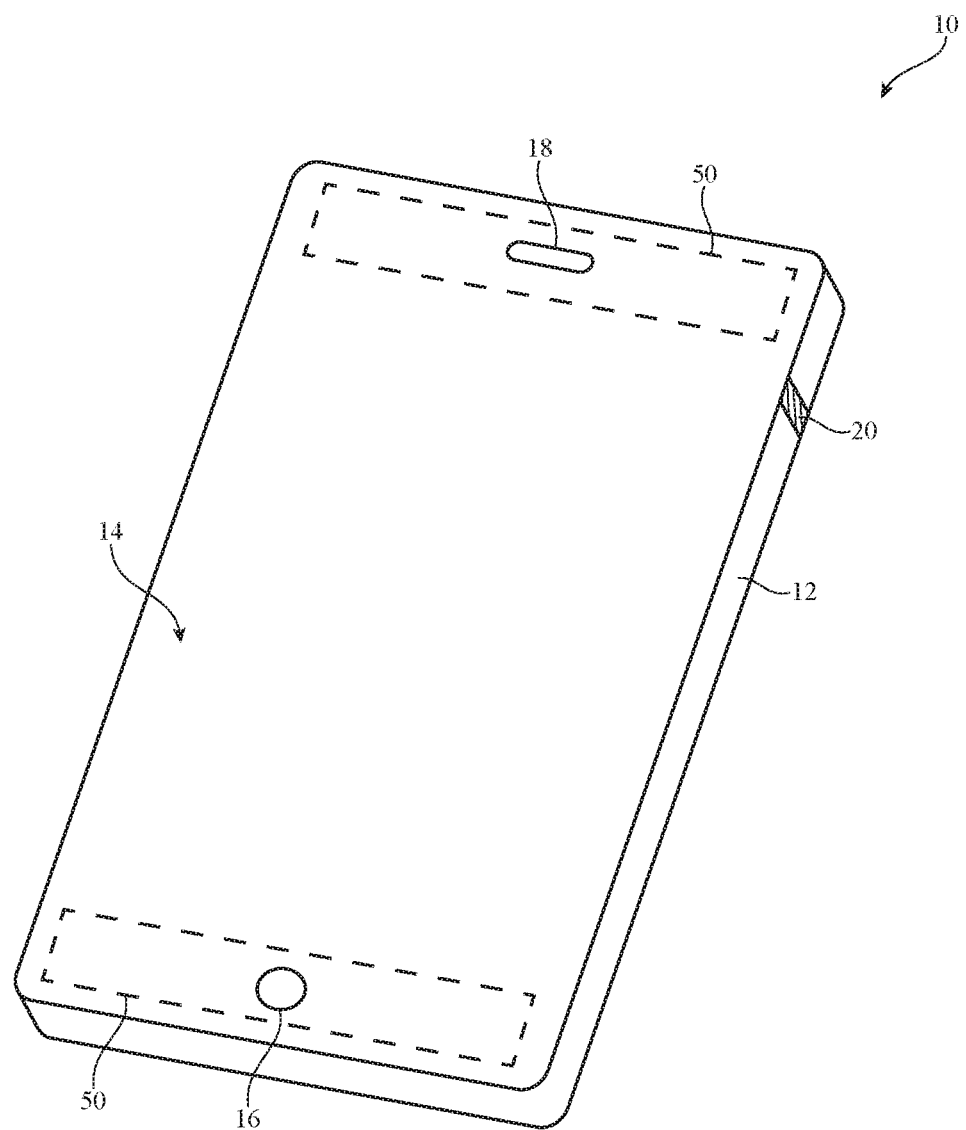
FIG. 1 is a perspective view of an illustrative electronic device with wireless communications circuitry in accordance with an embodiment.

An electronic device such as electronic device 10 of FIG. 1 may contain wireless circuitry. The wireless circuitry may include one or more antennas. The antennas may include phased antenna arrays that are used for handling millimeter wave communications. Millimeter wave communications, which are sometimes referred to as extremely high frequency (EHF) communications, involve signals at 60 GHz or other frequencies between about 10 GHz and 400 GHz. If desired, device 10 may also contain wireless communications circuitry for handling satellite navigation system signals, cellular telephone signals, local wireless area network signals, near-field communications, light-based wireless communications, or other wireless communications.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

As shown in FIG. 1, device 10 may include a display such as display 14. Display 14 may be mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 14 may be protected using a display cover layer such as a layer of transparent glass, clear plastic, sapphire, or other transparent dielectric. Openings may be formed in the display cover layer. For example, an opening may be formed in the display cover layer to accommodate a button such as button 16. An opening may also be formed in the display cover layer to accommodate ports such as speaker port 18. Openings may be formed in housing 12 to form communications ports (e.g., an audio jack port, a digital data port, etc.). Openings in housing 12 may also be formed for audio components such as a speaker and/or a microphone. Dielectric-filled openings 20 such as plastic-filled openings may be formed in metal portions of housing 12 (e.g., to serve as antenna windows and/or to serve as gaps that separate portions of antennas from each other).

Antennas may be mounted in housing 12. If desired, some of the antennas (e.g., antenna arrays that may implement beam steering, etc.) may be mounted under an inactive border region of display 14 (see, e.g., illustrative antenna locations 50 of FIG. 1). Display 14 may contain an active area with an array of pixels (e.g., a central rectangular portion). Inactive areas of display 14 are free of pixels and may form borders for the active area. If desired, antennas may also operate through dielectric-filled openings in the rear of housing 12 or elsewhere in device 10.

To avoid disrupting communications when an external object such as a human hand or other body part of a user blocks one or more antennas, antennas may be mounted at multiple locations in housing 12. Sensor data such as proximity sensor data, real-time antenna impedance measurements, signal quality measurements such as received signal strength information, and other data may be used in determining when one or more antennas is being adversely affected due to the orientation of housing 12, blockage by a user's hand or other external object, or other environmental factors. Device 10 can then switch one or more replacement antennas into use in place of the antennas that are being adversely affected.

Antennas may be mounted at the corners of housing, along the peripheral edges of housing 12, on the rear of housing 12, under the display cover layer that is used in covering and protecting display 14 on the front of device 10 (e.g., a glass cover layer, a sapphire cover layer, a plastic cover layer, other dielectric cover layer structures, etc.), under a dielectric window on a rear face of housing 12 or the edge of housing 12, or elsewhere in device 10.

Figure 2:
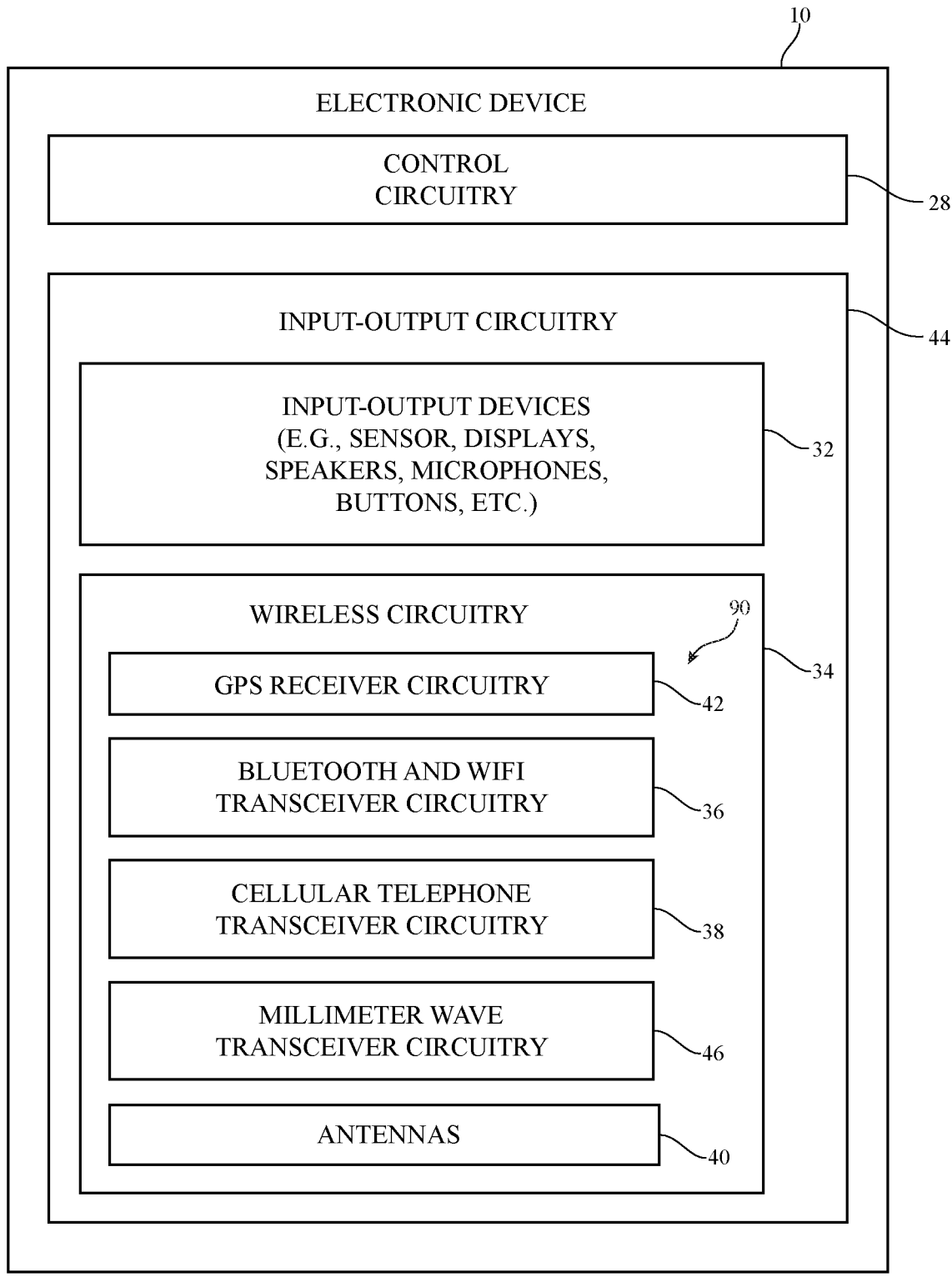
FIG. 2 is a schematic diagram of an illustrative electronic device with wireless communications circuitry in accordance with an embodiment.

A schematic diagram showing illustrative components that may be used in device 10 is shown in FIG. 2. As shown in FIG. 2, device 10 may include storage and processing circuitry such as control circuitry 28. Control circuitry 28 may include storage such as hard disk drive storage, non-volatile memory (e.g., flash memory or other electrically-programmable-read-only memory configured to form a solid state drive), volatile memory (e.g., static or dynamic random-access-memory), etc. Processing circuitry in control circuitry 28 may be used to control the operation of device 10. This processing circuitry may be based on one or more microprocessors, microcontrollers, digital signal processors, baseband processor integrated circuits, application specific integrated circuits, etc.

Control circuitry 28 may be used to run software on device 10, such as internet browsing applications, voice-over-internet-protocol (VOIP) telephone call applications, email applications, media playback applications, operating system functions, etc. To support interactions with external equipment, control circuitry 28 may be used in implementing communications protocols. Communications protocols that may be implemented using control circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, satellite navigation system protocols, etc.

Device 10 may include input-output circuitry 44. Input-output circuitry 44 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 44 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas 40, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 34 may include transceiver circuitry 36, 38, 42, and 46.

Transceiver circuitry 36 may be wireless local area network transceiver circuitry. Transceiver circuitry 36 may handle 2.4 GHz and 5 GHz bands for WiFi® (IEEE 802.11) communications and may handle the 2.4 GHz Bluetooth® communications band.

Circuitry 34 may use cellular telephone transceiver circuitry 38 for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples). Circuitry 38 may handle voice data and non-voice data.

Millimeter wave transceiver circuitry 46 (sometimes referred to as extremely high frequency transceiver circuitry) may support communications at extremely high frequencies (e.g., millimeter wave frequencies such as extremely high frequencies of 10 GHz to 400 GHz or other millimeter wave frequencies). For example, circuitry 46 may support IEEE 802.11ad communications at 60 GHz. Circuitry 46 may be formed from one or more integrated circuits (e.g., multiple integrated circuits mounted on a common printed circuit in a system-in-package device, one or more integrated circuits mounted on different substrates, etc.).

Wireless communications circuitry 34 may include satellite navigation system circuitry such as Global Positioning System (GPS) receiver circuitry 42 for receiving GPS signals at 1575 MHz or for handling other satellite positioning data (e.g., GLONASS signals at 1609 MHz). Satellite navigation system signals for receiver 42 are received from a constellation of satellites orbiting the earth.

In satellite navigation system links, cellular telephone links, and other long-range links, wireless signals are typically used to convey data over thousands of feet or miles. In WiFi® and Bluetooth® links at 2.4 and 5 GHz and other short-range wireless links, wireless signals are typically used to convey data over tens or hundreds of feet. Extremely high frequency (EHF) wireless transceiver circuitry 46 may convey signals over these short distances that travel between transmitter and receiver over a line-of-sight path. To enhance signal reception for millimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 10 can be switched out of use and higher-performing antennas used in their place.

Wireless communications circuitry 34 can include circuitry for other short-range and long-range wireless links if desired. For example, wireless communications circuitry 34 may include circuitry for receiving television and radio signals, paging system transceivers, near field communications (NFC) circuitry, etc.

Antennas 40 in wireless communications circuitry 34 may be formed using any suitable antenna types. For example, antennas 40 may include antennas with resonating elements that are formed from loop antenna structures, patch antenna structures, inverted-F antenna structures, slot antenna structures, planar inverted-F antenna structures, monopoles, dipoles, helical antenna structures, Yagi (Yagi-Uda) antenna structures, hybrids of these designs, etc. If desired, one or more of antennas 40 may be cavity-backed antennas. Different types of antennas may be used for different bands and combinations of bands. For example, one type of antenna may be used in forming a local wireless link antenna and another type of antenna may be used in forming a remote wireless link antenna. Dedicated antennas may be used for receiving satellite navigation system signals or, if desired, antennas 40 can be configured to receive both satellite navigation system signals and signals for other communications bands (e.g., wireless local area network signals and/or cellular telephone signals). Antennas 40 can include phased antenna arrays for handling millimeter wave communications.

Figure 3:
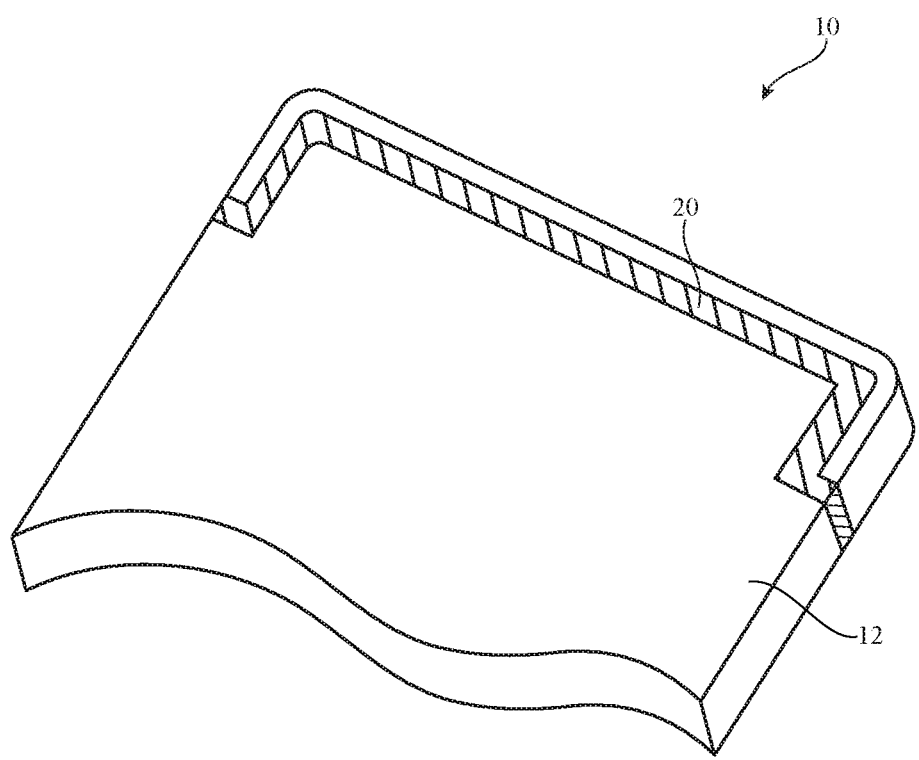
FIG. 3 is a rear perspective view of a portion of an illustrative electronic device in accordance with an embodiment.

In configurations for device 10 in which housing 12 has portions formed from metal, openings may be formed in the metal portions to accommodate antennas 40. For example, openings in a metal housing wall may be used in forming slot antenna structures and inverted-F antenna structures for cellular telephone antennas. These openings may be filled with a dielectric such as plastic. As shown in FIG. 1, for example, a portion of plastic-filled opening 20 may run up one or more of the sidewalls of housing 12. FIG. 3 is a rear perspective view of housing 12 of device 10 of FIG. 1 showing how opening 20 of FIG. 1 may be formed within the rear wall of housing 12 and may run across the width of device 12. Openings such as opening 20 (e.g., plastic-filled openings or other dielectric filled openings) may be formed in other metal portions of housing 12 (e.g., front face housing portions on the front face of device 10, sidewall housing portions, rear wall housing portions on the rear face of device 10, etc.). The arrangements shown in FIGS. 1 and 3 are merely illustrative.

In addition to forming parts of a cellular telephone antenna (e.g., a gap that separates an inverted-F antenna resonating element from an antenna ground structure and/or a slot in a hybrid slot inverted-F antenna, etc.), openings such as opening 20 may serve as antenna windows for millimeter wave antennas. One or more millimeter wave antennas may, for example, be aligned along slot-shaped (elongated) opening 20 of FIG. 3.

Figure 4:
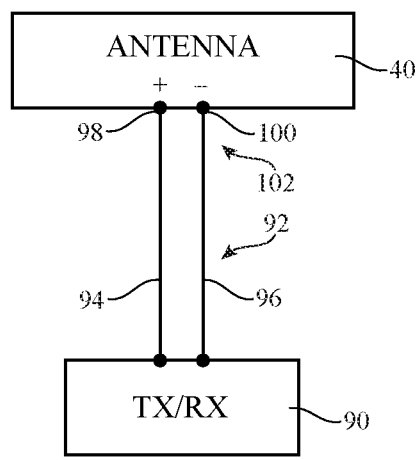
FIG. 4 is a diagram of an illustrative transceiver circuit and antenna in accordance with an embodiment.

A schematic diagram of a millimeter wave antenna or other antenna 40 coupled to transceiver circuitry 90 (e.g., millimeter wave transceiver circuitry 46 and/or other transceiver circuitry 90) is shown in FIG. 4. As shown in FIG. 4, radio-frequency transceiver circuitry 90 may be coupled to antenna feed 102 of antenna 40 using transmission line 92. Antenna feed 102 may include a positive antenna feed terminal such as positive antenna feed terminal 98 and may have a ground antenna feed terminal such as ground antenna feed terminal 100. Transmission line 92 may be formed form metal traces on a printed circuit or other conductive structures and may have a positive transmission line signal path such as path 94 that is coupled to terminal 98 and a ground transmission line signal path such as path 96 that is coupled to terminal 100. Transmission line paths such as path 92 may be used to route antenna signals within device 10. For example, transmission line paths may be used to couple antenna structures such as one or more antennas in an array of antennas to transceiver circuitry 90. Transmission lines in device 10 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within transmission line 92 and/or circuits such as these may be incorporated into antenna 40 (e.g., to support antenna tuning, to support operation in desired frequency bands, etc.).

Device 10 may contain multiple antennas 40. The antennas may be used together or one of the antennas may be switched into use while other antenna(s) are switched out of use. If desired, control circuitry 28 may be used to select an optimum antenna to use in device 10 in real time and/or to select an optimum setting for adjustable wireless circuitry associated with one or more of antennas 40. Antenna adjustments may be made to tune antennas to perform in desired frequency ranges, to perform beam steering with a phased antenna array, and to otherwise optimize antenna performance. Sensors may be incorporated into antennas 40 to gather sensor data in real time that is used in adjusting antennas 40.

In some configurations, antennas 40 may include antenna arrays (e.g., phased antenna arrays to implement beam steering functions). For example, the antennas that are used in handling millimeter wave signals for extremely high frequency wireless transceiver circuits 46 may be implemented as phased antenna arrays. The radiating elements in a phased antenna array for supporting millimeter wave communications may be patch antennas, dipole antennas, dipole antennas with directors and reflectors in addition to dipole antenna resonating elements (sometimes referred to as Yagi antennas or beam antennas), or other suitable antenna elements. Transceiver circuitry can be integrated with the phased antenna arrays to form integrated phased antenna array and transceiver circuit modules.

Figure 5:
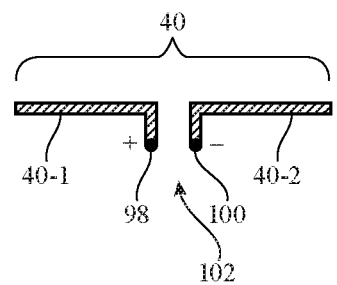
FIG. 5 is a diagram of an illustrative dipole antenna in accordance with an embodiment.

An illustrative dipole antenna is shown in FIG. 5. As shown in FIG. 5, dipole antenna 40 may have first and second arms such as arms 40-1 and 40-2 and may be fed at antenna feed 102. If desired, a dipole antenna such as dipole antenna 40 of FIG. 5 may be incorporated into a Yagi antenna (e.g., by incorporating a reflector and directors into dipole antenna 40 of FIG. 5).

Figure 6:
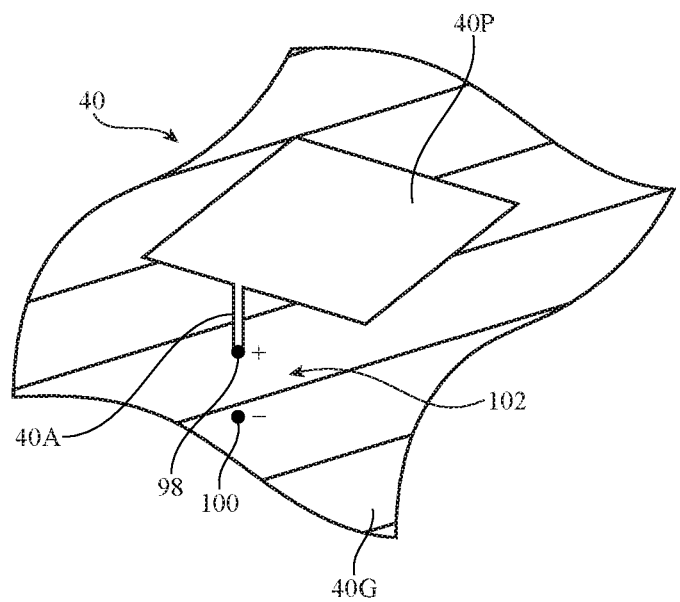
FIG. 6 is a perspective view of an illustrative patch antenna that may be used in an electronic device in accordance with an embodiment.

An illustrative patch antenna is shown in FIG. 6. As shown in FIG. 6, patch antenna 40 may have a patch antenna resonating element 40P that is separated from and parallel to a ground plane such as antenna ground plane 40G. Arm 40A may be coupled between patch antenna resonating element 40P and positive antenna feed terminal 98 of antenna feed 102. Ground antenna feed terminal 100 of feed 102 may be coupled to ground plane 40G.

Antennas of the types shown in FIGS. 5 and 6 and/or other antennas 40 may be used in forming millimeter wave antennas. The examples of FIGS. 5 and 6 are merely illustrative.

Antennas 40 may be formed from sheet metal parts (e.g., strips of sheet metal embedded in molded plastic or attached to dielectric supports using adhesive, etc.), may be formed from wires, may be formed from portions of conductive housing structures (e.g., metal walls in housing 12), and/or may be formed from conductive structures such as metal traces on a printed circuit or other substrate. Printed circuits in device 10 may be rigid printed circuit boards formed from rigid printed circuit board substrate material (e.g., fiberglass-filled epoxy) and/or may be flexible printed circuit boards (e.g., printed circuits formed from sheets of polyimide or other flexible polymer layers).

Figure 7:
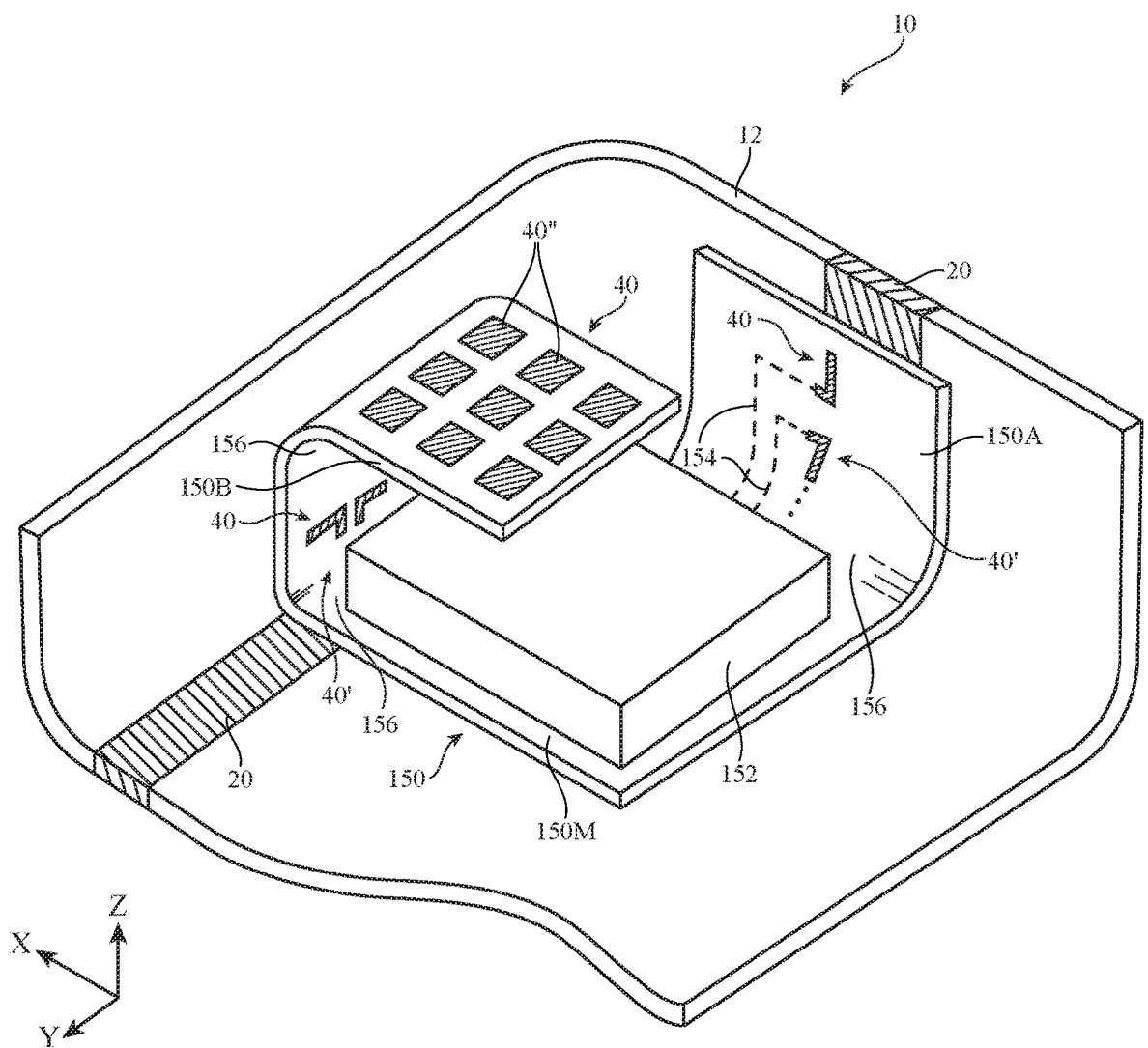
FIG. 7 is a perspective view of a portion of an illustrative electronic device with millimeter wave antennas and millimeter wave transceiver circuitry on a flexible printed circuit in accordance with an embodiment.

FIG. 7 is a perspective view of an interior portion of device 10 in an illustrative configuration in which antennas 40 have been formed from metal traces on flexible printed circuit 150.

Antennas 40 may include dipole antennas such as dipole antennas 40' that are aligned with respective portions of plastic-filled slot 20 in metal housing wall 12. Each dipole antenna 40' may have arms that run along the length of slot 20. By aligning dipole antennas 40' (e.g., Yagi antennas or other dipoles) with slot 20, antennas 40' may transmit and/or receive millimeter wave signals. Antennas 40 may also include patch antennas such as patch antennas 40". Dipole antennas 40' and patch antennas 40" may be arranged in arrays to support beam steering operations. Antenna ground for patch antennas 40" may be formed using metal traces in printed circuit 150 and/or other conductive structures (e.g., portions of housing 12, metal shield structures, etc.).

As shown in FIG. 7, flexible printed circuit 150 may have a main portion such as portion 150M and one or more bent protruding areas. For example, flexible printed circuit 150 may have areas such as areas 150A and 150B (e.g., extended portions that extend from main portion 150M so that a bent portion of flexible printed circuit 150 lies between the extended portions and main portion 150M).

Protruding portions of flexible printed circuit 150 such as protrusions 150A and 150B of FIG. 7 may be formed from elongated strips of flexible printed circuit substrate material that extend outwardly from the flexible printed circuit substrate material in main area 150M. Circuitry 152 may be formed on main portion 150M and/or other portions of printed circuit 150. Circuitry 152 may be, for example, transceiver circuitry such as transceiver circuitry 90 of FIG. 2 (e.g., millimeter wave transceiver circuitry 46 or other transceiver circuitry). Circuitry 152 may be formed from a system-in-package device based on multiple integrated circuits and/or one or more other integrated circuits (e.g., millimeter wave transceiver integrated circuits). If desired, circuitry 152 may include a power regulator integrated circuit, inductors, and other circuits. Circuitry 152 may be mounted under one or more shields. A shield may be formed from a shielding can or may be formed from a thin-film shielding layer formed on a plastic layer (sometimes referred to as a mold cap or plastic cap) that covers one or more integrated circuits and/or other electrical components in circuitry 152. A thin-film shielding layer may be formed from shielding materials such as metal and/or magnetic materials and may have a thickness of less than 100 microns, less than 50 microns, less than 25 microns, less than 12 microns, more than 1 micron, more than 5 microns, or other suitable thickness.

Transmission lines formed from metal traces such as metal traces 154 may be used to couple antennas 40 on portions 150A and 150B to transceiver circuitry 152. Metal traces 154 may extend between circuitry 152 and antennas 40' and 40" across bent portions 156 of flexible printed circuit 150.

If desired, patch antenna resonating elements for antennas 40" may be formed on the underside of printed circuit 150 so that these resonating elements face upwards (in the positive Z direction of FIG. 7) after arm 150B of flexible printed circuit 150 has been folded back on itself as shown in FIG. 7. This allows patch antennas 40" to transmit and receive antenna signals through the display cover layer of device 10 in one of regions 50 (FIG. 1). Dipole antennas 40' may transmit and receive antenna signals through dielectric-filled openings such as opening 20 (as an example).

During operation, transceiver circuitry 152 may transmit and/or receive antenna signals (e.g., millimeter wave signals) to antennas 40' and/or antennas 40". If desired, transceiver circuitry 152 may adjust the phase and magnitude of the signals being conveyed through printed circuit 150 to implement beam steering.

In the example of FIG. 7, arm 150A is bent upwards at 90° relative to main portion 150M, so that the surface normal for arm 150A is perpendicular to the surface normal for main portion 150M and arm 150B is bent by 180° relative to main portion 150M so that the surface normal for the tip of arm 150B is parallel to the surface normal of portion 150M (although reversed by 180°. Each arm extends outwardly from main portion 150M in a direction that is at a right angle with respect to the other (i.e., arm 150A extends along the Y dimension and arm 150B extends along the X dimension in the arrangement of FIG. 7). Other configurations may be used for the bent protruding portions of printed circuit 150, if desired (e.g., configurations in which bent arms are bent by less than 90°, by 90-180°, by more than 180°, configurations in which arms 150A and 150B extend in directions that are not perpendicular to each other, etc.). The configuration of FIG. 7 is merely illustrative.

Figure 8:
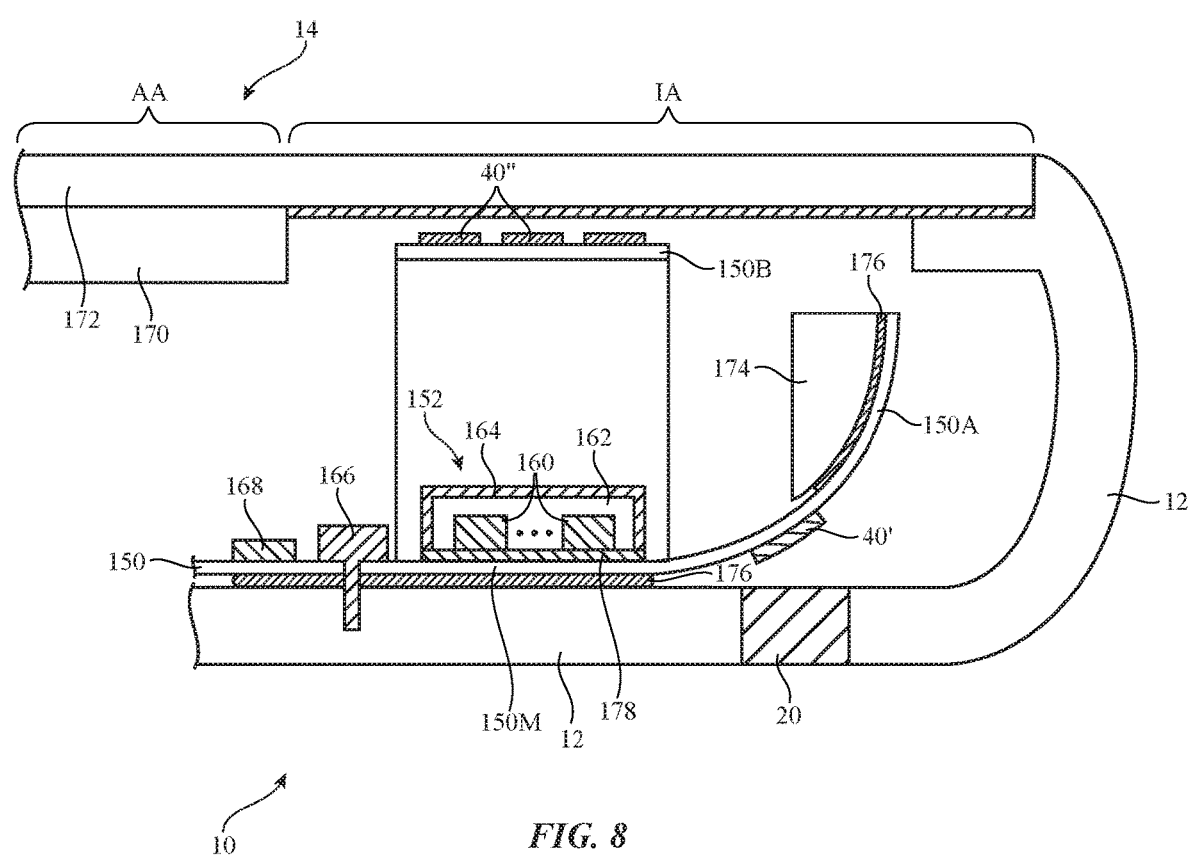
FIG. 8 is across-sectional side view of illustrative millimeter wave transceiver circuitry and antennas on a flexible printed circuit in an electronic device in accordance with an embodiment.

A cross-sectional side view of a portion of a device such as device 10 of FIG. 7 taken along dimension Y and viewed in dimension X is shown in FIG. 8. As shown in FIG. 8, display 14 may have an active area such as active area AA that contains a display module (display) such as display module 170 (e.g., an organic light-emitting diode display, a liquid crystal display, etc.) and a clear display cover layer 172 (e.g., a layer of glass, a layer of sapphire, a layer of transparent plastic, and/or other clear dielectric materials). Display module 170 may contain an array of pixels in active area AA. Display module 170 may, if desired, be omitted from regions such as regions 50 of FIG. 1, thereby forming inactive areas such as inactive area IA that do not contain pixels and that do not display images for a user. As shown in FIG. 8, an array of antennas (e.g., a beam steering array) such as patch antennas 40" may be formed on printed circuit arm 150B under inactive area IA (i.e., so that patch antennas 40" lie in a plane parallel to the plane of display cover layer 172 in inactive area IA). Arm 150A of printed circuit 150 may bend upwards until arm 150A lies in a plane parallel to the sidewall of housing 12. Arms 150A and 150B may be supported by plastic support structures. Opaque masking material such as ink layer 171 may be formed on the underside of display cover layer 172 in inactive area IA to help block internal components such as antennas 40" from view.

Support structures such as dielectric support structures may be used to support flexible printed circuit 150. For example, a support structure such as curved support structure 174 may be used to support arm 150A, so that one or more antennas 40' may be aligned with dielectric-filled opening 20 in housing 12. Support structure 174 may be formed from plastic or other dielectric. Optional adhesive 176 may, if desired, be used to attach flexible printed circuit arm 150A to support structure 174 and may be used to attach main portion 150M of flexible printed circuit 150 to a rear wall portion of housing 12. Metal housing portions of housing 12 may serve as antenna ground. Metal traces on printed circuit 150 (e.g., ground traces) may be coupled to metal portions of housing 12 (antenna ground) using conductive structures such as metal screw 166 or other fasteners. A connector such as connector 168 may be used to interconnect circuitry on printed circuit 150 to other circuitry in device 10. For example, connector 168 may be coupled to a connector on a rigid or flexible printed circuit that contains integrated circuits and other electrical components.

Circuitry 152 on main portion 150M of printed circuit 150 may include one or more integrated circuits and/or other electrical components such as components 160. Components 160 may form transceiver circuitry 90 (e.g., millimeter wave transceiver circuitry 46 and/or other transceiver circuitry). A dielectric such as a plastic mold cap 162 (encapsulant) may cover components 160. A layer of metal and/or other shielding layers may be used to form shield 164. Shield 164 may be formed using sheet metal or thin-film layer(s) deposited on mold cap 162. Circuitry 152 may be a system-in-package device in which components 164 are soldered to metal traces in a system-in-package substrate such as printed circuit 178 or printed circuit 178 may be omitted. In configurations in which printed circuit 178 is omitted, components 160 may be mounted directly on printed circuit 150 (e.g., using solder).

Figure 9:
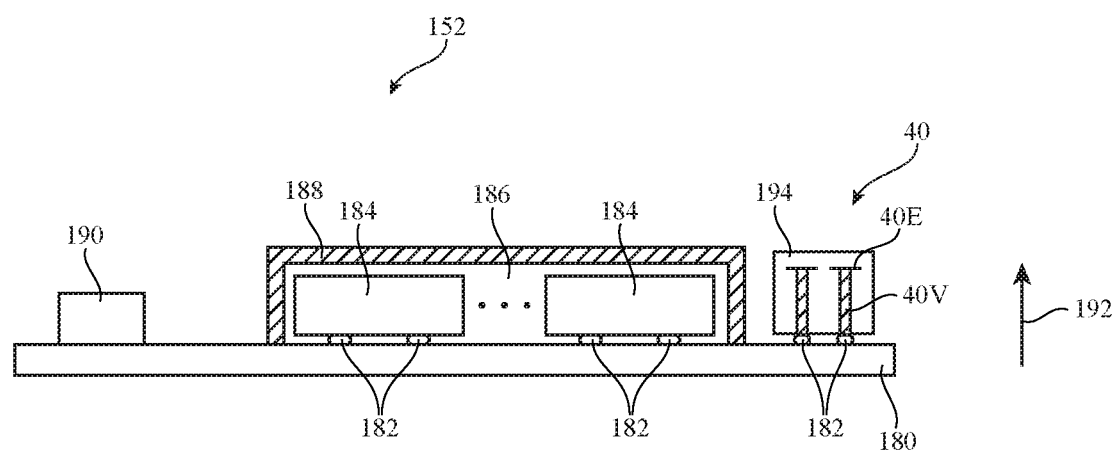
FIG. 9 is a cross-sectional side view of illustrative wireless circuitry on a printed circuit in accordance with an embodiment.

FIG. 9 is a cross-sectional side view of a printed circuit to which circuitry 152 has been mounted using a configuration in which electrical components 184 in circuitry 152 are soldered directly to printed circuit 180 using solder 182 and no intervening printed circuit. If desired, components 184 may be mounted on an optional printed circuit substrate and the optional printed circuit substrate may be soldered to printed circuit 180. The configuration of FIG. 9 is merely illustrative.

As shown in FIG. 9, antennas 40 may be formed from components mounted on printed circuit 180 such as antenna traces 40E on printed circuit substrate 194. Antenna traces 40E may be patch antenna resonating elements, dipole antenna elements, or other antenna resonating elements and may be coupled by metal traces such as vias 40V and solder 182 to metal traces in printed circuit 180. The elevated height (in dimension 192 in the example of FIG. 9) of antenna traces 40E relative to antenna ground (e.g., ground traces in printed circuit 180 and/or metal portions of housing 12 under printed circuit 180) may help enhance the performance of antennas 40. Antennas 40 of FIG. 9 may operate through display cover layer 172 as described in connection with FIG. 8, may be aligned with a plastic-filled opening in metal portions of housing 12 such as slot 20 of FIG. 8, and/or may be mounted elsewhere in device 10. There may be any suitable number of antennas 40 on printed circuit substrate 194 and the other arrays of antenna resonating elements in device 10 (e.g., 2-32, 16-25, more than 2, more than 4, more than 16, fewer than 16, fewer than 32, etc.).

Circuitry 152 (e.g., transceiver circuitry 90 such as transceiver circuitry 46) may be implemented using components (e.g., integrated circuits, etc.) such as components 184. Components 184 may be mounted to printed circuit 180 using solder 182. A plastic mold cap such as mold cap 186 or other encapsulant may, if desired, be formed over components 184. Shield 188 may be formed from metal and/or other shielding materials. Shield 188 may be a shield can or may be a shielding structure formed from thin-film shielding layers on mold cap 186. Connectors such as connector 190 may be attached to printed circuit 180 (e.g., using solder) to facilitate connection of printed circuit 180 to other printed circuits and components in device 10. Printed circuit 180 may be a rigid printed circuit or a flexible printed circuit.

Device 10 may include antennas such as antennas 40 of FIG. 9, antennas 40 of FIG. 7, and/or other antennas 40 at one, two, three, or four corners of device 10, along one or more edges of device 10, in portions of the rear housing wall of housing 12 of device 10, under corner portions or edge portions of display cover layer 172, and/or in other portions of device 10.

The foregoing is merely illustrative and various modifications can be made to the described embodiments. The foregoing embodiments may be implemented individually or in any combination.

What is claimed is:
1. An electronic device, comprising:
a conductive housing having a dielectric opening;
a dielectric layer mounted to the conductive housing;
a printed circuit substrate in the conductive housing;
radio-frequency transceiver circuitry mounted to the printed circuit substrate;

a first antenna array formed on the printed circuit substrate, wherein the first antenna array is configured to transmit and receive radio-frequency signals through the dielectric layer; and a second antenna array formed on the printed circuit substrate, wherein the second antenna array is configured to transmit and receive additional radio-frequency signals through the dielectric opening in the conductive housing.

2. The electronic device defined in claim 1, wherein the dielectric layer forms a first surface of the electronic device and the conductive housing forms a second surface of the electronic device, the first surface opposing the second surface.

3. The electronic device defined in claim 2, further comprising:

a display mounted to the dielectric layer and having an active area and an inactive area, wherein the first antenna array is configured to transmit and receive the radio-frequency signals through the inactive area of the display.

4. The electronic device defined in claim 3, wherein the dielectric opening is formed at the second surface of the electronic device.

5. The electronic device defined in claim 3, wherein the conductive housing includes a conductive sidewall that extends from the first surface to the second surface and the dielectric opening is formed at the conductive sidewall.

6. The electronic device defined in claim 1, further comprising:

a third antenna array formed on the printed circuit substrate, wherein the radio-frequency transceiver circuitry is disposed between the first antenna array and the second antenna array.

7. The electronic device defined in claim 6, wherein the printed circuit substrate comprises a first bent portion between the radio-frequency transceiver circuitry and a first millimeter wave antenna resonating element and a second bent portion between the radio-frequency transceiver circuitry and a second millimeter wave antenna resonating element.

8. The electronic device defined in claim 6, wherein the third antenna array is configured to transmit and receive millimeter wave radio-frequency signals through the dielectric opening.

9. The electronic device defined in claim 1, wherein the first antenna array is formed on a first portion of the printed circuit substrate, the second antenna array is formed on a second portion of the printed circuit substrate, the first portion is separated from the dielectric layer by a first distance, the second portion is separated from the dielectric layer by a second distance, and the second distance is less than the first distance.

10. The electronic device defined in claim 1, wherein the printed circuit substrate has first and second opposing printed circuit substrate surfaces, the radio-frequency transceiver circuitry is mounted to the first printed circuit substrate surface, and the first antenna array is formed on the second printed circuit substrate surface.

11. The electronic device defined in claim 10, wherein metal traces at the printed circuit substrate couple the first antenna array to the radio-frequency transceiver circuitry.

12. The electronic device defined in claim 11, wherein additional metal traces at the printed circuit substrate are coupled to an antenna ground for the first antenna array.

13. The electronic device defined in claim 12, wherein the antenna ground is at least partly formed from the conductive housing and the additional metal traces are coupled to the conductive housing with a conductive fastener that passes through the printed circuit substrate.

14. The electronic device defined in claim 1, further comprising:

a dielectric structure mounted to the printed circuit substrate that aligns the second antenna array with the dielectric opening.

15. The electronic device defined in claim 14, wherein the dielectric structure overlaps the second antenna array and the dielectric opening.

16. The electronic device defined in claim 1, wherein the radio-frequency transceiver circuitry is soldered directly to the printed circuit substrate.

17. The electronic device defined in claim 1, wherein the printed circuit substrate comprises a flexible printed circuit substrate, the dielectric layer comprises a display cover layer, and the conductive housing comprises a peripheral sidewall that contains the dielectric opening.

18. The electronic device defined in claim 17, wherein the radio-frequency transceiver circuitry comprises an integrated circuit soldered to the flexible printed circuit substrate.

19. The electronic device defined in claim 1, wherein the first antenna array comprises a first phased antenna array and the second antenna array comprises a second phased antenna array.

20. The electronic device defined in claim 19, wherein the radio-frequency signals and the additional radio-frequency signals each comprise at least a frequency greater than 10 GHz.

* * * * *